United States Patent
Prommel et al.

(10) Patent No.: US 9,553,481 B2
(45) Date of Patent: Jan. 24, 2017

(54) SOLAR-POWERED LIGHTING DEVICE AND CHARGING SYSTEM

(71) Applicant: Goal Zero LLC, Bluffdale, UT (US)

(72) Inventors: Mark Prommel, Brooklyn, NY (US); Marco Perry, Brooklyn, NY (US); Pil Ho Chung, Jersey City, NJ (US); Kevin O'Leary, Brooklyn, NY (US); Avi Bajpai, Brooklyn, NY (US); Todd Brunner, Brooklyn, NY (US); Keyvan Vasefi, Payson, UT (US); Walker Ford, Holladay, UT (US); Robert Norman Gardner, Highland, UT (US)

(73) Assignee: GOAL ZERO LLC, Bluffdale, UT (US)

( * ) Notice: Subject to any disclaimer, the term of this patent is extended or adjusted under 35 U.S.C. 154(b) by 395 days.

(21) Appl. No.: 14/191,070

(22) Filed: Feb. 26, 2014

(65) Prior Publication Data
US 2014/0239717 A1    Aug. 28, 2014

Related U.S. Application Data

(60) Provisional application No. 61/770,955, filed on Feb. 28, 2013.

(51) Int. Cl.
*H02J 1/10*    (2006.01)
*H02J 3/38*    (2006.01)
(Continued)

(52) U.S. Cl.
CPC .............. *H02J 7/355* (2013.01); *H05B 37/00* (2013.01); *F21S 8/086* (2013.01); *F21S 9/032* (2013.01);
(Continued)

(58) Field of Classification Search
CPC ...... H05B 37/00; Y10T 307/305; Y02B 20/72
(Continued)

(56) References Cited

U.S. PATENT DOCUMENTS 7,021,787 B1 *  4/2006  Kuelbs .................... A45B 3/04
                                                362/183
7,932,638 B2 *  4/2011  Randall ................. G06F 1/1616
                                                307/150
(Continued)

OTHER PUBLICATIONS

Enerfusion Inc., Solar Power-Dok, Product Brochure, retrieved from the internet at http://www.enerfusioninc.com/sites/default/files/brochures/solar-dok-1.pdf, understood to be publically available Apr. 18, 2011, 3 pages.
(Continued)

*Primary Examiner* — Jared Fureman
*Assistant Examiner* — Esayas Yeshaw
(74) *Attorney, Agent, or Firm* — Foley & Lardner LLP

(57) ABSTRACT

A freestanding solar-powered charging system includes a baseplate, a substantially vertical frame member having a first end and a second end, the first end coupled to and extending from the baseplate, one or more panels coupled to the second end of the vertical frame member, each of the panels having an upper surface with a photovoltaic cell, an energy storage device electrically coupled to the photovoltaic cell, and one or more electrical connectors supported by the vertical frame member and electrically coupled to the energy storage device, the electrical connectors configured to engage any one or more of a plurality of consumer electronic devices for charging the consumer electronic devices.

19 Claims, 21 Drawing Sheets

(51) Int. Cl.
*H02J 7/34* (2006.01)
*H02J 7/35* (2006.01)
*H05B 37/00* (2006.01)
F21S 8/08 (2006.01)
F21S 9/03 (2006.01)
F21Y 101/00 (2016.01)

(52) U.S. Cl.
CPC ............. *F21Y 2101/00* (2013.01); *Y02B 20/72* (2013.01); *Y10T 307/305* (2015.04)

(58) Field of Classification Search
USPC .......................................................... 307/18
See application file for complete search history.

(56) References Cited

U.S. PATENT DOCUMENTS

| | | | | | |
|---|---|---|---|---|---|
| 8,450,601 | B2* | 5/2013 | Li | .............................. | E04B 2/88 136/244 |
| 8,716,889 | B2* | 5/2014 | Vaidyanathan | ..... | H01L 31/0504 307/43 |
| 8,742,629 | B2* | 6/2014 | Ichikawa | .................. | H02J 3/32 307/130 |
| 2004/0228118 | A1 | 11/2004 | Peterson | | |
| 2009/0038673 | A1* | 2/2009 | Ware | ..................... | H01L 31/048 136/246 |
| 2012/0091943 | A1* | 4/2012 | Manor | ....................... | H02J 7/35 320/101 |
| 2012/0260967 | A1* | 10/2012 | Dwyer | ................... | H02S 20/00 136/244 |
| 2013/0056991 | A1* | 3/2013 | Petersen | ................. | F03D 9/007 290/55 |
| 2014/0021903 | A1* | 1/2014 | Seiling | ................. | H02J 7/0042 320/101 |
| 2014/0028242 | A1 | 1/2014 | Akin et al. | | |
| 2014/0132301 | A1* | 5/2014 | Gillispie | ................. | H02S 50/10 324/761.01 |

OTHER PUBLICATIONS

Enerfusion Solstice, Product Brochure, retrieved from the internet at http://www.enerfusioninc.com/sites/default/files/brochures/solstice-1.pdf, understood to be publically available Jun. 17, 2013, 3 pages.

City Charge, Product Images, retrieved from http://green barrelenergy.com, understood to be publically available on Jan. 1, 2014, 3 pages.

* cited by examiner

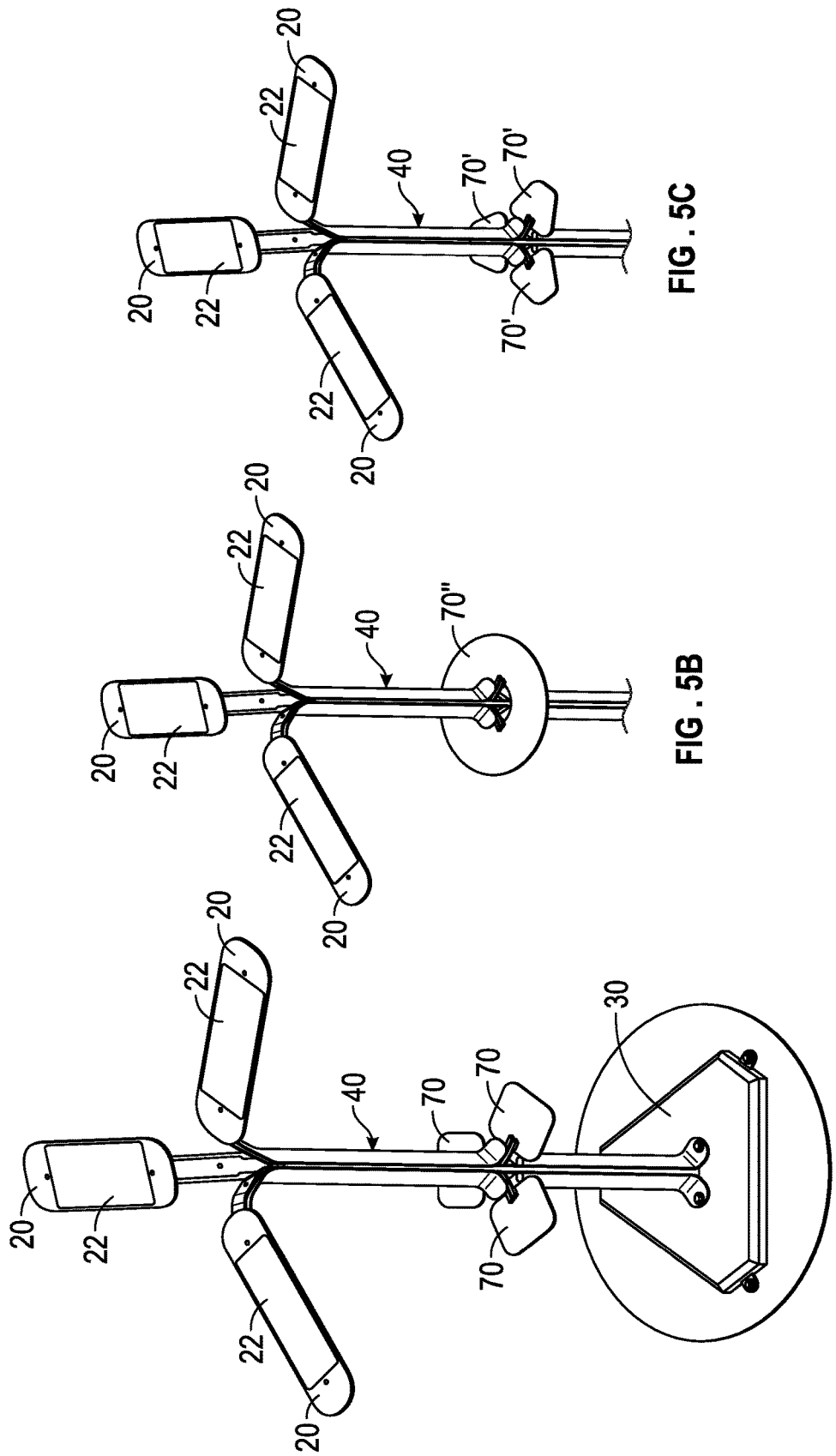

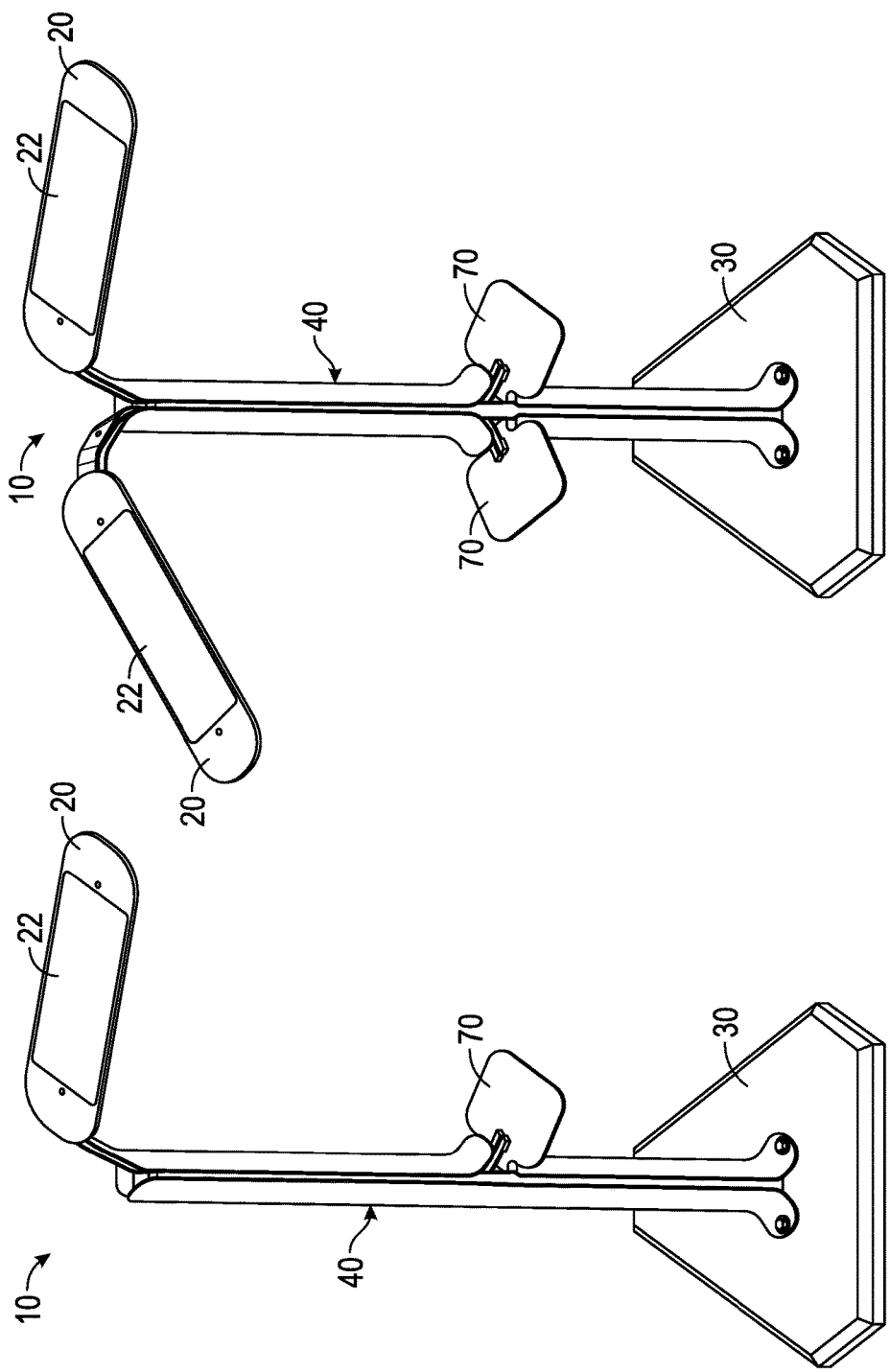

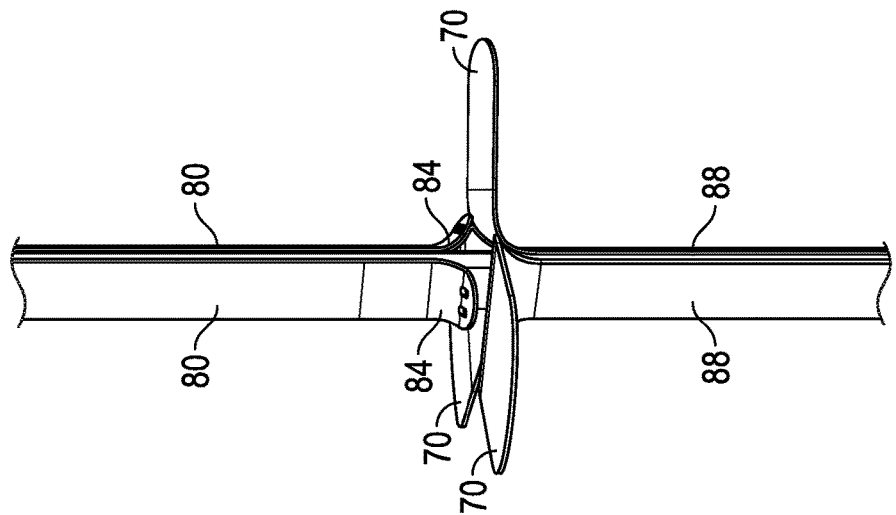
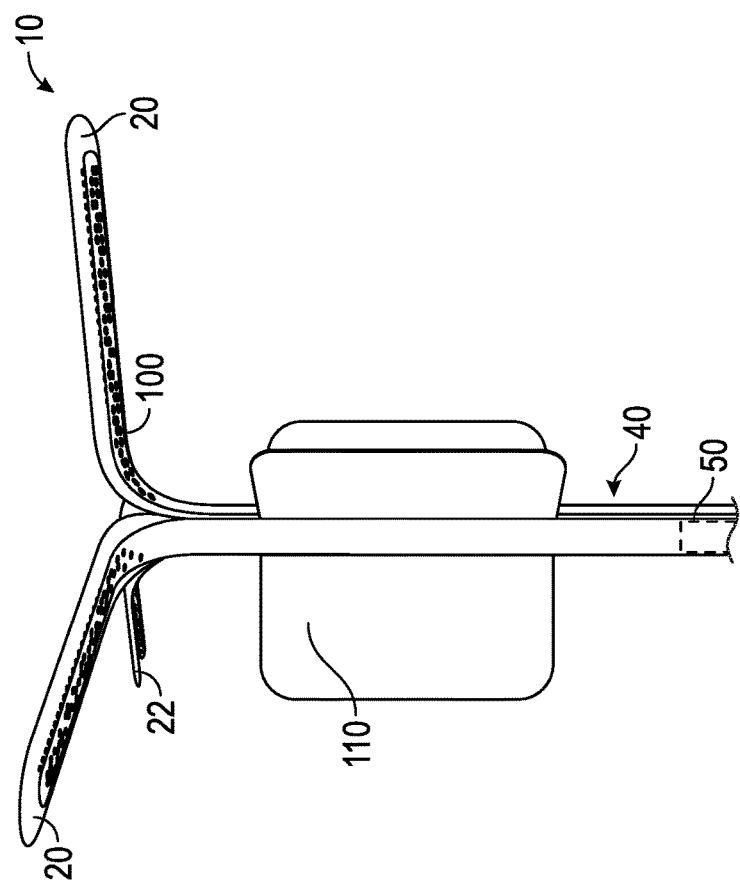
FIG. 8B
FIG. 8A

SOLAR-POWERED LIGHTING DEVICE AND CHARGING SYSTEM

CROSS-REFERENCE TO RELATED APPLICATIONS

This Application claims the benefit of U.S. Provisional Patent Application No. 61/770,955, titled "Solar-Powered Lighting Device and Charging System" and filed Feb. 28, 2013, which is incorporated herein by reference in its entirety.

FIELD

The present disclosure relates generally to the field of solar-powered energy storage systems. More specifically, the present disclosure relates to solar-powered energy storage systems that provide one or more lighting devices and charging stations for charging any of a variety of portable, rechargeable electrical devices. More specifically still, the present disclosure relates to a free-standing solar-powered lighting device and charging station that may be deployed in a wide variety of locations to provide an aesthetically-pleasing and convenient location for use by appropriate users to recharge their portable electronic devices (e.g., computing devices, communication devices, tablets, smartphones, navigation devices, etc.).

BACKGROUND

This section is intended to provide a background or context to the subject matter. The description herein may include concepts that could be pursued, but are not necessarily ones that have been previously conceived or pursued. Therefore, unless otherwise indicated herein, what is described in this section is not prior art to the description in this application and is not admitted to be prior art by inclusion in this section.

It is generally known to provide solar panels that are configured to store energy in a battery, and an electrical connection from the battery for charging another battery. However, the conventional solar-powered charging systems are not readily adaptable for use as freestanding charging stations and workstations (e.g., for using the device while it is recharging) that may be deployed in any of a wide variety of locations independent of conventional electrical supplies.

Accordingly, it would be desirable to provide one or more freestanding solar-powered energy storage and charging systems that overcome these and other disadvantages.

SUMMARY

One embodiment of the disclosure relates to a freestanding solar-powered charging system that includes a baseplate, a substantially vertical frame member having a first end and a second end, the first end coupled to and extending from the baseplate, one or more panels coupled to the second end of the vertical frame member, each of the panels having an upper surface with a photovoltaic cell, an energy storage device electrically coupled to the photovoltaic cell, and one or more electrical connectors supported by the vertical frame member and electrically coupled to the energy storage device, the electrical connectors configured to engage any one or more of a plurality of consumer electronic devices for charging the consumer electronic devices.

Another embodiment of the disclosure relates to a free-standing solar-powered charging system that includes a column having three frame members arranged to form a substantially triangular cross section, each frame member having a first end and a second end, the first end configured for coupling to a support surface. The freestanding solar-powered charging system also includes three panels coupled one each to the second end of each of the frame members and angularly spaced substantially equidistant from each other, each of the panels having an upper surface with at least one photovoltaic cell, an energy storage device disposed within the column and electrically coupled to the photovoltaic cells, one or more electrical connectors supported by each of the frame members and electrically coupled to the energy storage device, the electrical connectors configured to engage any one or more of a plurality of consumer electronic devices for charging the consumer electronic devices, and at least one platform coupled to each of the frame members proximate an associated electrical connector and configured to support the consumer electronic devices during charging.

Yet another embodiment of the disclosure relates to a freestanding solar-powered charging system that includes a baseplate, a substantially vertical frame member having a first end and a second end, the first end coupled to and extending from the baseplate, one or more panels coupled to the second end of the vertical frame member, each of the panels having an upper surface with a photovoltaic cell, an energy storage device electrically coupled to the photovoltaic cell, one or more electrical connectors supported by the vertical frame member and electrically coupled to the energy storage device, the electrical connectors configured to engage any one or more of a plurality of consumer electronic devices for charging the consumer electronic devices, and signage coupled to the vertical frame member.

BRIEF DESCRIPTION OF THE FIGURES

The invention will become more fully understood from the following detailed description taken in conjunction with the accompanying drawings wherein like reference numerals refer to like elements, in which:

FIGS. 5A-5C provide perspective views of the freestanding solar-powered lighting device and charging system of FIGS. 1A-1D having workstations in a variety of shapes and sizes;

FIGS. 6A-6B provide perspective view of the freestanding solar-powered lighting device and charging system of FIGS. 1A-1D having different numbers of solar panels and workstations;

FIGS. 8A-8E provide perspective views of the freestanding solar-powered lighting device and charging system of FIGS. 1A-1D having signage and various base mounting systems, according to various embodiments;

DETAILED DESCRIPTION

Figure 1A:
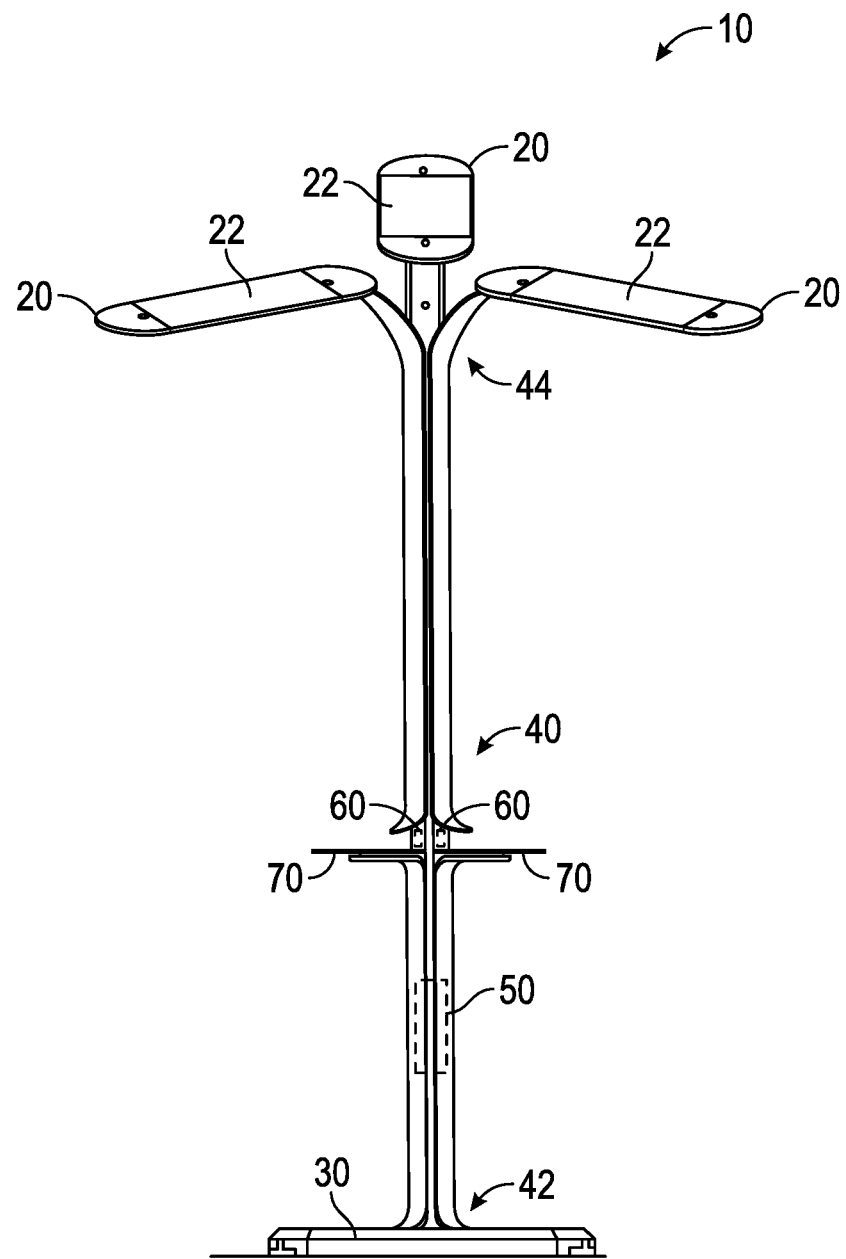
FIGS. 1A-1D provide various schematic views of a freestanding solar-powered lighting device and charging system, according to the exemplary systems and methods described herein.
Figure 1B:
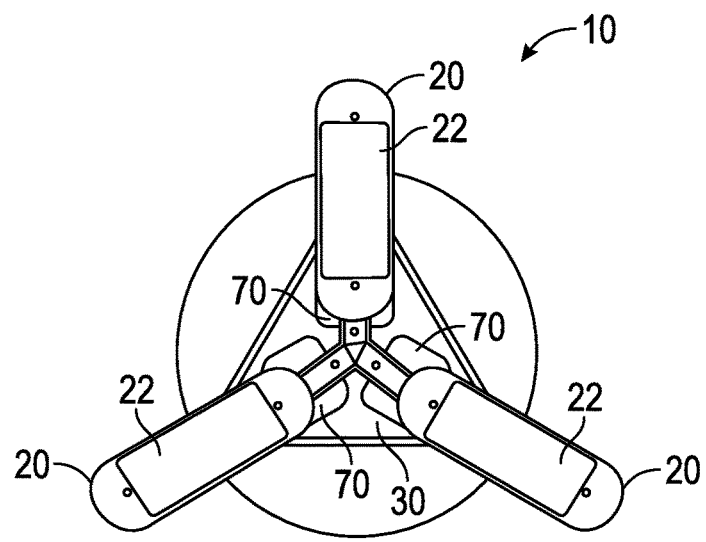
Figure 1C:
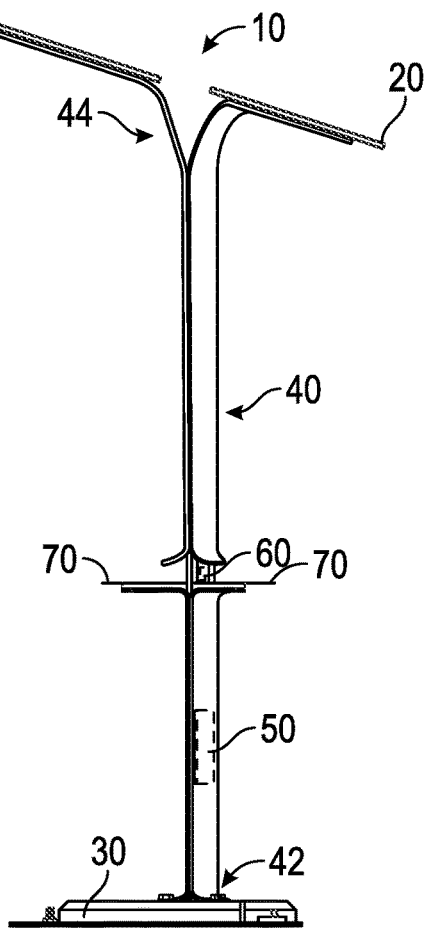
Figure 1D:
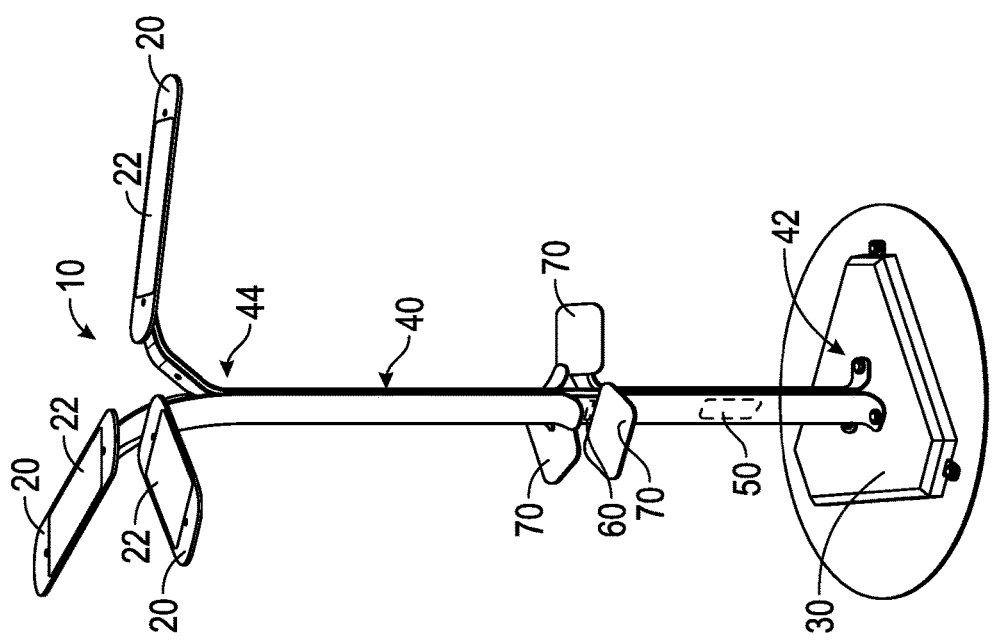
Figure 2B:
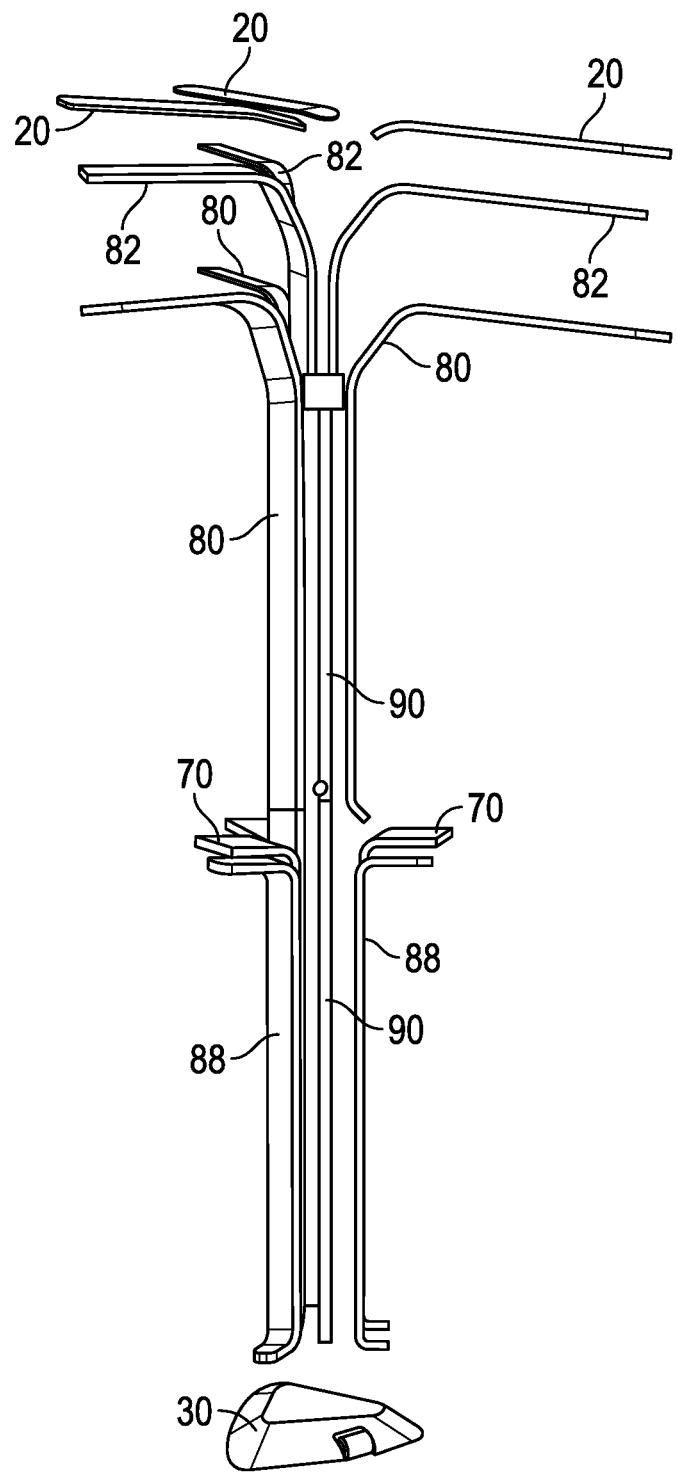

According to the exemplary embodiment shown in FIGS. 1A-1D, a solar-powered charging system, shown as charging system 10, includes a plurality of panels, shown as panels 20, coupled to a base, shown as baseplate 30, with a substantially vertical frame member, shown as frame member 40. In one embodiment, panels 20 are bent aluminum plates. Charging system 10 provides a station at which users may charge their portable electronic devices or perform other tasks, according to an exemplary embodiment. While shown in FIGS. 1A-1D as substantially vertical, it should be understood that, according to alternative embodiments, frame member 40 may angled or otherwise positioned. As shown in FIG. 1D, frame member 40 includes a first end 42 and a second end 44, first end 42 coupled to and extending from baseplate 30. Panels 20 are coupled to second end 44 of frame member 40, according to an exemplary embodiment. Baseplate 30 may be weighted to provide stability to frame member 40 and panels 20. In other embodiments, baseplate 30 has a shape (e.g., a diameter, etc.) or includes a feature (e.g., cleats, a rubberized bottom) intended to improve the stability of and/or reduce the movement of frame member 40 and panels 20. In other embodiments, charging system 10 does not include baseplate 30, and frame member 40 couples panels 20 directly to a support surface (e.g., a floor, a sidewalk, etc.).

As shown in FIGS. 1A-1D, charging system 10 is a freestanding unit capable of supporting panels 20 without external support members. Charging system 10 may be positioned in various locations without relying upon surrounding structures for support or power. By way of example, charging system 10 may be positioned in any of a wide variety of public, commercial, or outdoor locations and applications where sunlight is readily available, such as (but not limited to) street corners, atriums, parks, outdoor markets, school or college campuses, business parks, etc. without requiring any support from external frame members or devices. In one embodiment, only the support surface (e.g., floor, sidewalk, boardwalk, etc.) below baseplate 30 supports charging system 10. Charging system 10 facilitates charging consumer electronic devices without any electrical connections to an external power source (e.g., to the electrical grid), according to an exemplary embodiment.

Referring still to the exemplary embodiment shown in FIGS. 1A-1D, panels 20 have upper surfaces and bottom surfaces. Photovoltaic cells 22 are disposed on panels 20. In one embodiment, photovoltaic cells 22 define a portion of the upper surfaces of panels 20. In another embodiment, photovoltaic cells 22 are coupled to the upper surfaces of panels 20. Photovoltaic cells 22 may be positioned at least 100 inches (e.g., 118 inches) above a ground surface below baseplate 30. According to the exemplary embodiment shown in FIG. 1C, the upper surfaces of panels 20 are substantially coplanar and angled relative to frame member 40 (e.g., relative to a central axis defined by frame member 40, etc.). Angling the upper surfaces of panels 20 may increase (e.g., maximize) an incidence of solar irradiation on photovoltaic cells 22. Increasing the incidence of solar irradiation increases the electricity generated by photovoltaic cells 22 and improves the efficiency of charging system 10, according to an exemplary embodiment. As shown in FIG. 1C, panels 20 are tilted at a common angle relative a central axis defined by frame member 40 when charging system 10 is viewed in a side profile. The angle of panels 20 is tailored for a particular location, venue, application, or surrounding environment, according to an exemplary embodiment. By way of example, the angle may be greater where a building to one side of charging system 10 obstructs solar irradiation duration a portion of the day. In some embodiments, the angle is adjustable. By way of example, the angle may be manually adjustable or may be automatically adjusted (e.g., using an actuator and controller to follow the path of the sun).

According to an exemplary embodiment, an energy storage device 50 is coupled to photovoltaic cells 22. Energy storage device 50 includes batteries, according to an exemplary embodiment, that may be charged using photovoltaic cells 22. Accordingly, solar energy may be stored for later use. By way of example, the stored solar energy may be used at dusk, nighttime, or other periods of lower solar exposure (e.g., on cloudy days or during cloudy periods of the day, etc.). As shown in FIGS. 1A-1D, energy storage device 50 is disposed within frame member 40. In other embodiments, energy storage device 50 is positioned within another portion of charging system 10 (e.g., within a portion of baseplate 30, within one or more panels 20, etc.).

As shown in FIGS. 1A-1D, charging system 10 includes a plurality of electrical connectors 60 and a plurality of platforms, shown as platforms 70. Electrical connectors 60 may be supported by frame member 40 and electrically coupled to energy storage device 50 via wiring and suitable circuitry (e.g., rectifiers). In one embodiment, electrical connectors 60 include a variety of AC and/or DC devices (depending on the application for the intended location) and are configured to engage any one or more of a plurality of consumer electronic devices for charging or operating the consumer electronic devices. According to an exemplary embodiment, electrical connectors 60 include a plurality of female electrical elements (e.g., micro USB ports, USB ports, standard electrical outlets, etc.). According to an alternative embodiment, electrical connectors 60 include a plurality of male electrical elements (e.g., micro USB, iPhone 4®, iPhone 5®, USB, a standard electrical plug end, etc.). According to still another alternative embodiment, electrical connectors 60 include both female and male electrical elements. The female and/or the male electrical elements may substantially fixed to a portion of charging system 10 (e.g., frame member 40, platforms 70, etc.), may be provided at the end of a length of cable so that the electrical connectors 60 may be selectively deployed from a pocket or other receptacle within a portion of charging system 10 (e.g., frame member 40, platforms 70, etc.), or a combination thereof. In still other embodiments, electrical connectors 60 include a 'multi-standard' plug that is configured to receive any of a wide variety of electric plug configurations (such as the various types of AC power cords associated with the AC electric power systems of different countries), or other plug configurations such as 12 VDC cigarette lighter plugs, 12 VDC barrel plugs, various smartphone plugs, and the like. In one embodiment, electrical connectors 60 are plated to improve the weather resistance (i.e., weather proofing) of electrical connectors 60.

According to the exemplary embodiment shown in FIGS. 1A-1D, platforms 70 are configured to support consumer electronic devices, provide a workspace upon which users may work, or a combination thereof. In other embodiments, at least one platform 70 includes at least a portion of energy storage device 50. By way of example, a battery pack may be coupled to a bottom side of platform 70. In one embodiment, platforms 70 are coupled to frame member 40 and disposed proximate the plurality of electrical connectors 60. As shown in FIGS. 1A-1D, the three platforms 70 are positioned proximate to three corresponding electrical connectors 60. Accordingly, users charging consumer electronic devices may rest their devices upon platforms 70 (e.g., while waiting for the consumer electronic device to charge, etc.).

Referring next to FIGS. 2A-3B, frame member 40 includes a modular construction that includes a plurality of components (e.g., multiple aluminum extrusions held together by extrusion features, screws, or a combination thereof), according to an exemplary embodiment. In one embodiment, frame member 40 is a column that includes three frame members arranged to from a substantially triangular cross section. Each of the frame members may include a first end and a second end, the first ends configured for coupling to a support surface. Panels 20 may be coupled to each of the frame members and angularly spaced (e.g., when viewed from above, radially spaced, etc.) substantially equidistant from each other. In one embodiment, one or more electrical connectors 60 are supported by each of the three individual frame members. At least one platform 70 may be coupled to each of the three individual frame members proximate the associated electrical connectors 60 and configured to support the consumer electronic devices during charging.

The modular construction of frame member 40 facilitates easy customization of the design or shape thereof to accommodate the needs of a particular location, venue, application, or surrounding environment. The system is intended to be readily modular and scalable through the use of its core components (e.g., elongated frame members, solar panels, connectors, batteries, workstations, baseplate configurations, illumination panels, signage, and associated seating or other integral structure, etc.) so that it can be flexed and scaled to meet the needs of a wide variety of applications and users. The system provides an elegant and recognizable structure that provides freestanding functionality, low-cost manufacturing, easy assembly, and structural durability. These core components are intended to provide a base structure capable of adapting to a wide variety of design permutations and for accommodating refinement of existing components and support of new components (e.g. for additional functionality to suit the needs of certain installation locations, etc.).

Figure 2A:
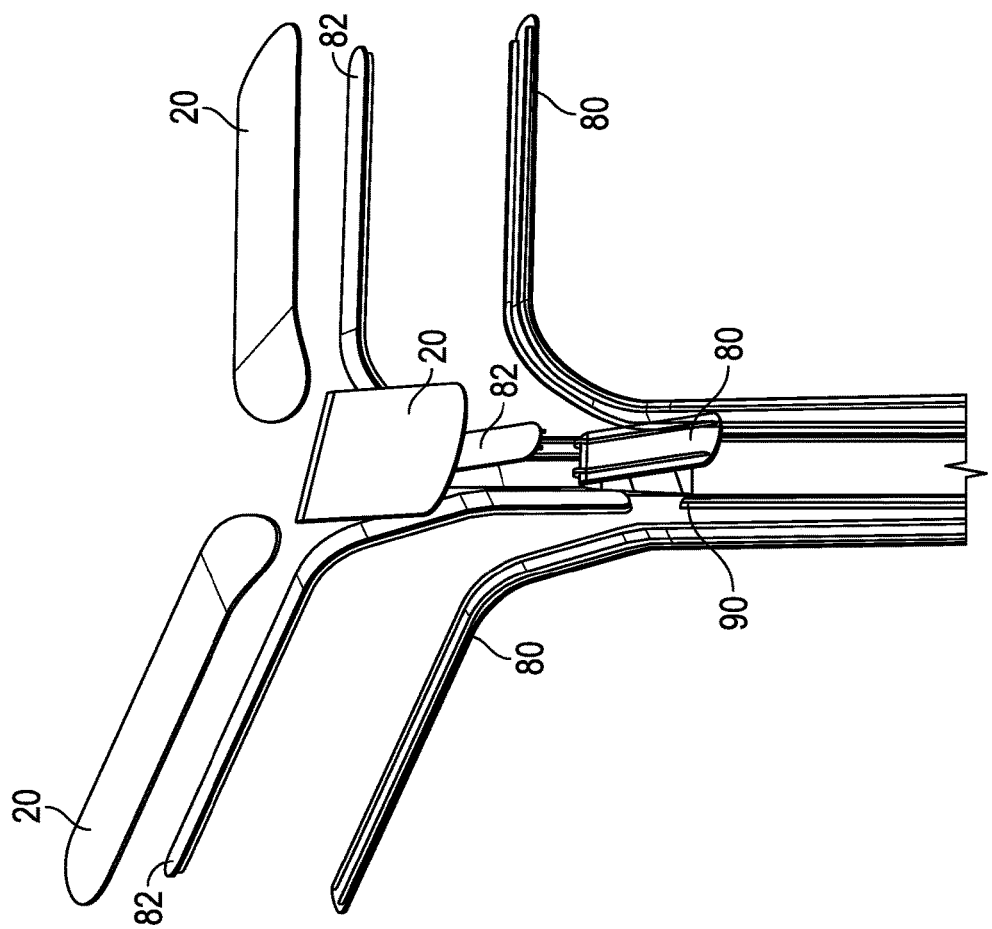
FIGS. 2A-2B provide exploded perspective views of the solar panel, elongated frame members and baseplate of the freestanding solar-powered lighting device and charging system of FIGS. 1A-1D.

As shown in FIGS. 2A-3B, frame member 40 includes a plurality of individual frame members 80. By way of example, individual frame members 80 may be bent aluminum extrusions that are shaped such that panels 20 are disposed and an angle to increase an incidence of solar irradiation on photovoltaic cells 22. In one embodiment, individual frame members 80 are coupled to a central core 90. By way of example, central core 90 may be an aluminum extrusion. As shown in FIGS. 2A-2B, panels 20 are coupled to individual frame members 80 with a plurality of intermediate brackets 82. Intermediate brackets 82 may also be aluminum extrusions.

Figure 3A:
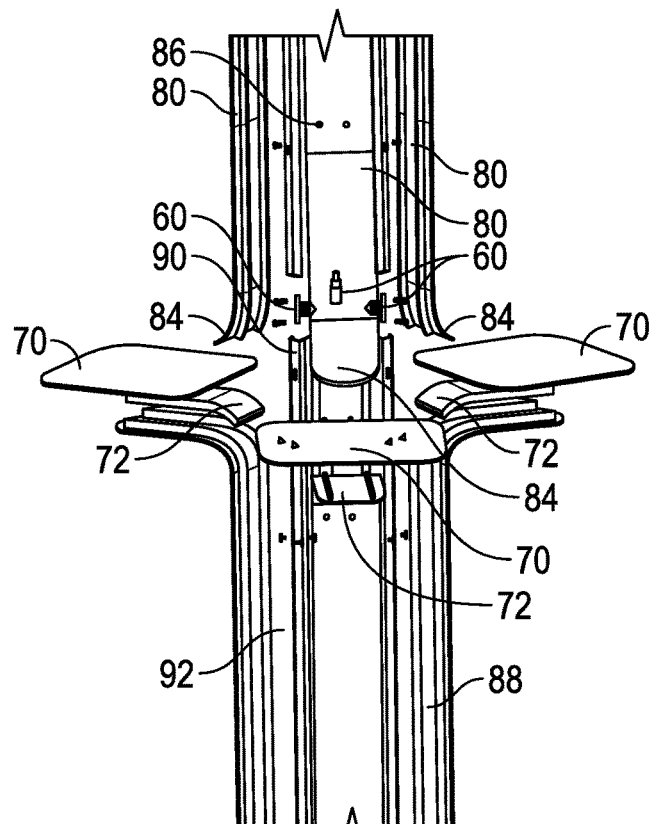
FIGS. 3A-3B provide exploded perspective views of the elongated frame members and workstations of the freestanding solar-powered lighting device and charging system of FIGS. 1A-1D.
Figure 3B:
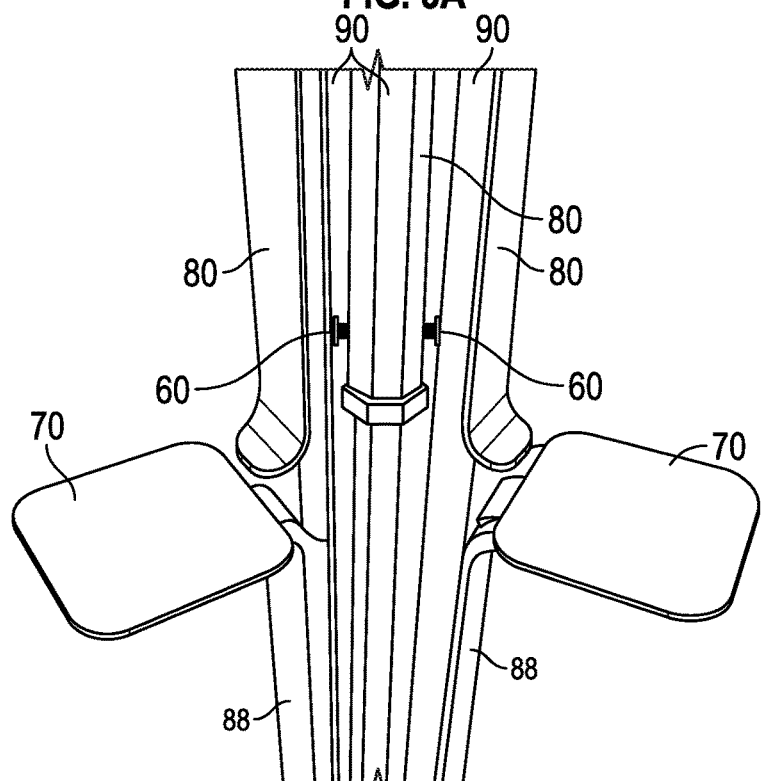

As shown in FIG. 3A, individual frame members 80 include covers 84 that are at least partially disposed over electrical connectors 60 when frame member 40 is assembled. In one embodiment, covers 84 are separate components that are coupled to individual frame members 80. According to the alternative embodiment shown in FIG. 3A, covers 84 are integrally formed with individual frame members 80. By way of example, individual frame members 80 may be bent to form portions that flare outward (e.g., away from a centerline of frame member 40) to define covers 84. As shown in FIG. 3A, a plurality of fasteners 86 are used to couple electrical connectors 60 to frame member 40 and couple the various components of frame member 40 together. In other embodiments, a press-fit, a snap-fit, an extruded feature, and/or another coupling mechanism is used to interconnect the various components of charging system 10.

Referring still to FIGS. 2B-3B, frame member 40 includes a plurality of individual frame members, shown as table supports 88. As shown in FIG. 3A, platform 70 is coupled to table support 88 with an intermediate cap 72. In one embodiment, platforms 70 are manufactured (e.g., water jet cut, laser cut, etc.) from aluminum plates, intermediate cap 72 is a bent aluminum extrusion, and table supports 88 are bent aluminum extrusions. A plurality of lower frame members, shown as corner fill elements 92, may be positioned along table supports 88 to at least partially hide central core 90 or other internal components of frame member 40.

Figure 4:
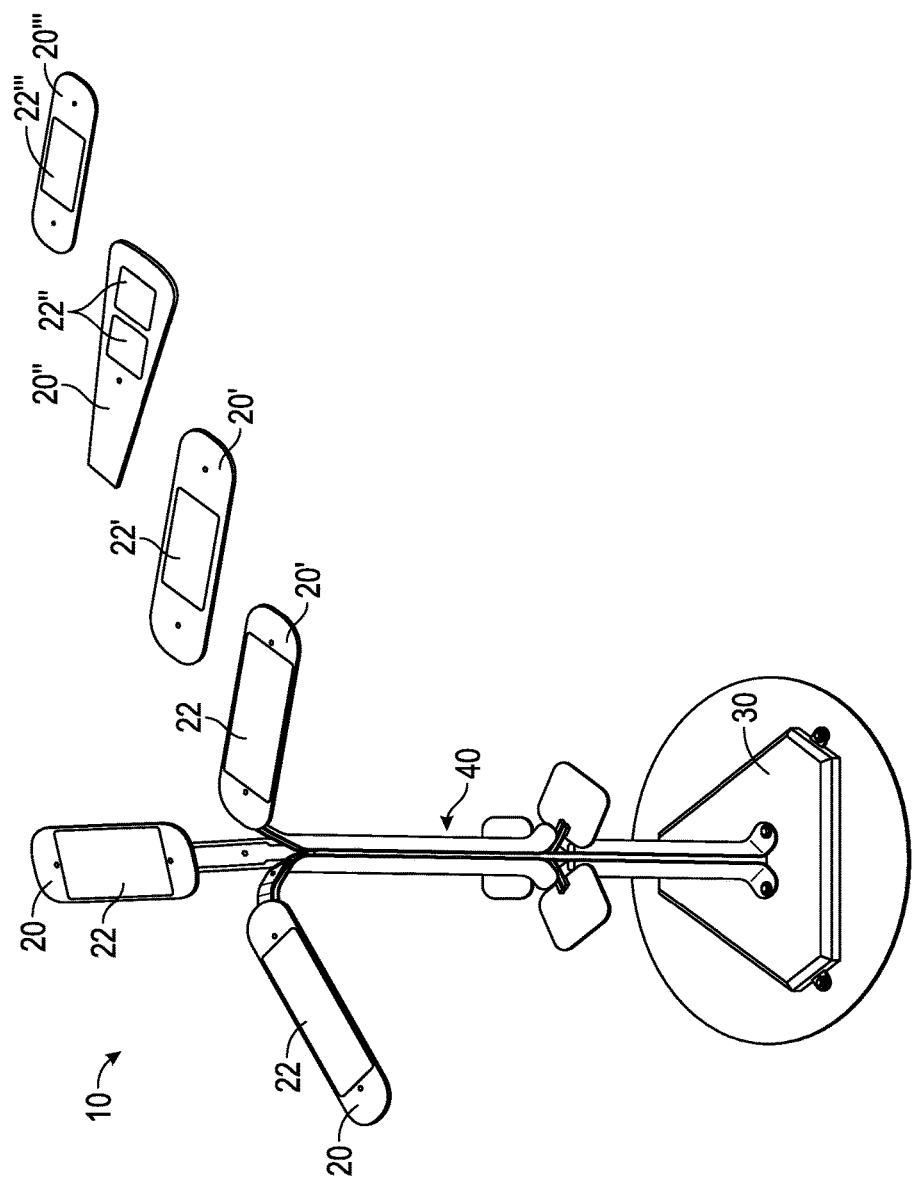
FIG. 4 is a perspective view of the freestanding solar-powered lighting device and charging system of FIGS. 1A-1D having solar panels in a variety of shapes and sizes.

Referring next to FIG. 4, panels 20 and photovoltaic cells 22 may be modular components. Accordingly, at least one of panels 20 and photovoltaic cells 22 may be replaced without altering, or without significantly alternating, the construction or design of frame member 40 and baseplate 30. In one embodiment, panels 20 and photovoltaic cells 22 have shapes that are tailored for a particular application (i.e., allow for custom power supply) or for a particular aesthetic appeal. As shown in FIG. 4, the panels may be shaped as panels 20, panels 20', panels 20", or panels 20'". The photovoltaic cells may be shaped as photovoltaic cells 22, photovoltaic cells 22', photovoltaic cells 22", or photovoltaic cells 22'". In other embodiments, at least one of panels 20 and photovoltaic cells 22 have still other shapes.

As shown in FIGS. 5A-5C, platforms 70 may have various shapes and sizes. By way of example, the platforms may be shaped as platforms 70 or platforms 70'. In other embodiments, charging system 10 includes a single unitary platform 70". Platforms 70 may be shaped to facilitate a particular task to be performed by a user (e.g., charging a tablet, etc.) or for a particular aesthetic appeal.

As shown in FIGS. 6A-6B, charging system 10 may include a single panel 20, photovoltaic cell 22, and platform 70, or a pair of panels 20, photovoltaic cells 22, and platforms 70, according to various alternative embodiments. Charging system 10 includes a number of panels 20, photovoltaic cells 22, and platforms 70 selected to suit a particular application, according to an exemplary embodiment. In other embodiments, charging system 10 includes a number of panels 20, photovoltaic cells 22, and platforms 70 selected for aesthetic appeal. Charging system 10 may include an equal number of panels 20, photovoltaic cells 22, and platforms 70 or an unequal number of panels 20, photovoltaic cells 22, and platforms 70, according to various alternative embodiments.

Figure 7A:
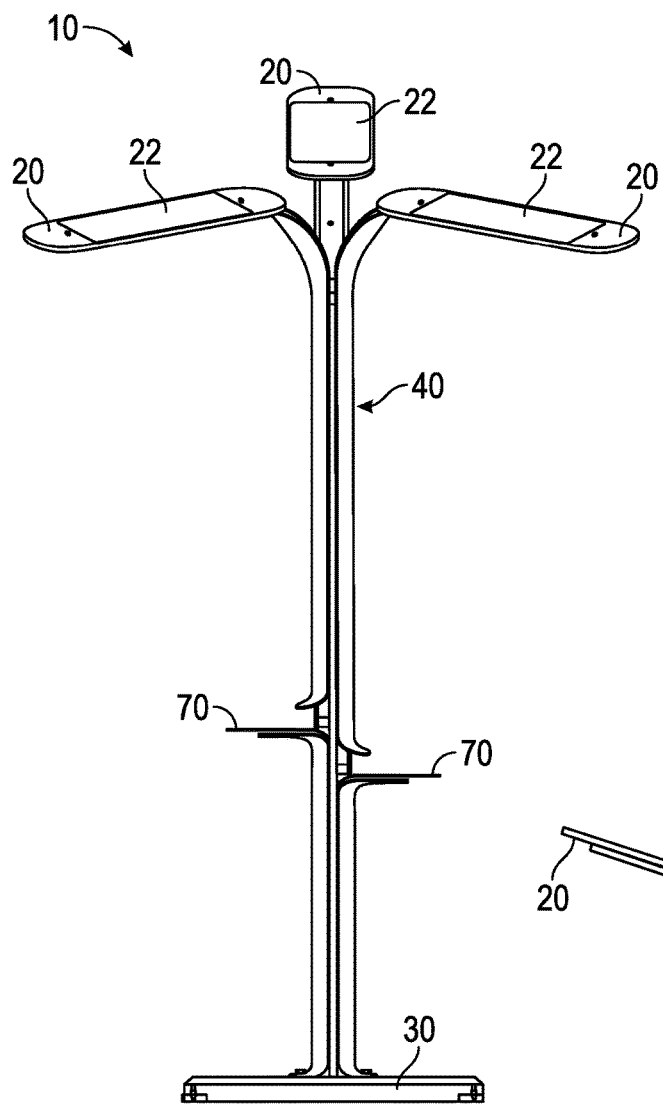
FIGS. 7A-7B are perspective views of the freestanding solar-powered lighting device and charging system of FIGS. 1A-1D having workstations of varying heights, and solar panels arranged at different angles, or varying degrees of tilt.
Figure 7B:
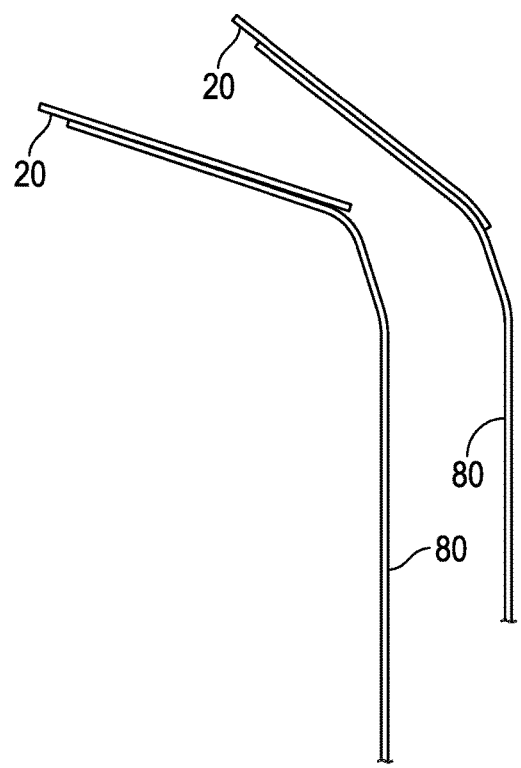

As shown in FIG. 7A, platforms 70 are positioned at different heights. In one embodiment, charging system 10 accommodates different age users by including platforms 70 positioned at different heights. In another embodiment, charging system 10 accommodates individuals in wheelchairs or users who are seated by including platforms 70 positioned at different heights. As shown in FIG. 7B, panels 20 may be positioned at various angles, according to alternative embodiments. By way of example, the angle of panels 20 may be varied by differentially bending individual frame member 80. Each of the panels 20 may be positioned at the same angle, or may be positioned at different angles, according to various embodiments.

According to the exemplary embodiment shown in FIG. 8A, charging system 10 includes a plurality of lighting devices 100. In one embodiment, charging system 10 having lighting devices 100 provides a self-contained source of nighttime illumination of the charging stations and workstations of the system. Lighting devices 100 may include a plurality of light emitting diodes (LEDs) or other lighting elements. According to an exemplary embodiment, lighting devices 100 include LEDs having any of a variety of colors to accomplish the strategic goals for the illumination (e.g., accent lighting, task lighting, area lighting, etc.). In one embodiment, panels 20 include lower surfaces, and lighting devices 100 (with or without lenses, diffusers, etc.) are positioned directly on the lower surfaces of panels 20 (i.e., on the undersides of panels 20) to provide direct illumination. In another embodiment, lighting devices 100 are provided in an upwardly-facing orientation on a separate member that is beneath and adjacent to a reflective underside of panels 20, thereby providing indirect reflective illumination. In still other embodiments, a combination of direct and reflective lighting in connection with the substantially planar surfaces of panels 20 may be provided.

Lighting devices 100 are electrically coupled with, and powered by, energy storage device 50, according to an exemplary embodiment. Lighting devices 100 are thereby powered by solar energy, which acts upon photovoltaic cells positioned atop panels 20 to charge energy storage device 50. In one embodiment, lighting devices 100 illuminate the area below and surrounding charging system 10 (e.g., illuminate at least one of a plurality of electrical connectors, etc.) thereby providing a freestanding lighting device that may be positioned in various locations without any electrical connections to an external power source. In another embodiment, lighting devices 100 electrically communicate with energy storage device 50 and are configured to illuminate an associated platform 70 (e.g., the platform 70 disposed on the same side of the triangular frame member 40).

Referring still to FIG. 8A, charging system 10 includes signage, shown as signage 110, coupled to frame member 40. Signage 110 may be configured to provide any of a variety of static or dynamic information, such as advertising, associated sponsorship, way-finding, etc. Signage 110 may be manufactured from various materials and have various sizes and shapes. As shown in FIG. 8A, signage 110 includes three panels. In other embodiments, signage 110 includes more or fewer panels or other devices. Signage 110 may be opaque or at least semi-transparent. In one embodiment, signage 110 is illuminated by lighting devices 100.

According to an alternative embodiment, signage 110 includes at least one of an illuminated (i.e., lit) sign, a light emitting diode (LED) display panel, and a liquid crystal display (LCD) display panel. According to an exemplary embodiment, signage 110 is self-illuminating (e.g., includes separate photovoltaic cells or a separate power source, etc.). According to an alternative embodiment, signage 110 is electrically coupled to, and powered by, energy storage device 50 such that signage 110 is powered by solar energy, which acts upon photovoltaic cells positioned atop panels 20 to charge energy storage device 50. Signage illuminated by lighting devices 100, self-illuminating signage 110, LED display panels, and/or LCD display panels offer increased visibility relative to traditional signs. In one embodiment, charging system 10 includes hardware (e.g., a wireless transceiver and a processing circuit) configured to transmit content to signage 110 from a remote location. In another embodiment, charging system 10 includes hardware (e.g., a memory and a processing circuit) configured to transmit stored content to signage 110. Charging system 10 may include only lighting devices, only electrical connectors, only signage, or any combination of lighting devices, electrical connectors, and signage, according to various embodiments.

Figure 8E:
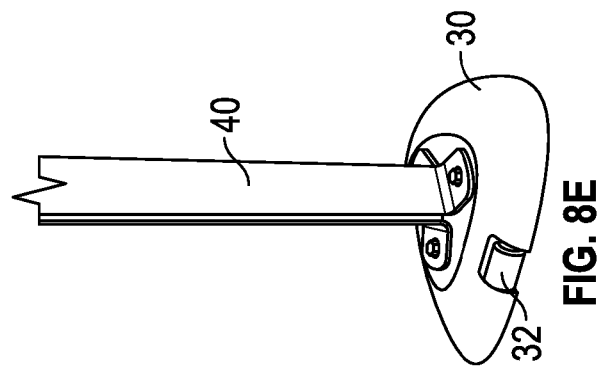
Figure 8D:
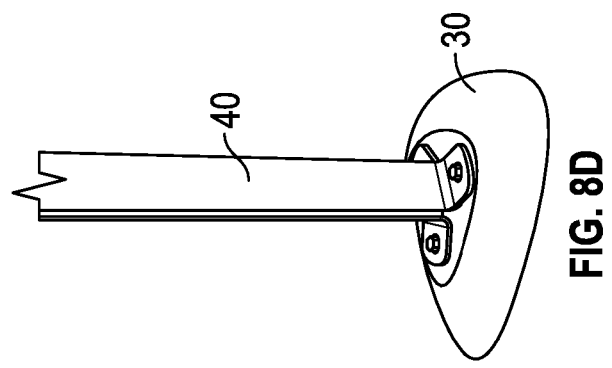
Figure 8C:
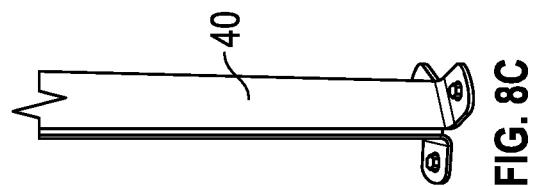

According to the various embodiments shown in FIGS. 8C-8E, charging system 10 may be directly coupled to a ground surface or may include a baseplate 30. In one embodiment, baseplate 30 is weighted. According to the exemplary embodiment shown in FIG. 8E, baseplate 30 includes an offset wheel 32. Frame member 40 and baseplate 30 may be tilted to engage offset wheel 32 such that charging system 10 may be rolled to any one of a plurality of locations (e.g., to different locations along a sidewalk, etc.).

According to another exemplary embodiment, charging system 10 includes hardware (e.g., a wireless transceiver and a processing circuit) configured to collect and transmit usage data and history. By way of example, the usage data and history may include information relating to at least one of the number of devices charged by charging system 10 (e.g., measured by start/stop cycles executed by charging electronics), information relating to the solar conditions at charging system 10, and the health of charging system 10. In still other embodiments, charging system 10 includes hardware configured to at least one of create a wi-fi hotspot and provide a cell phone signal repeater.

Figure 9B:
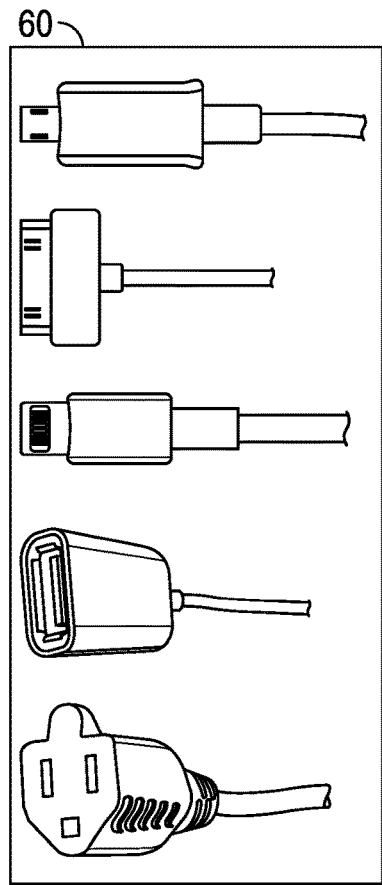
FIG. 9A-9B provide perspective views of a charging station and workstation portion of the freestanding solar-powered lighting device and charging system of FIGS. 1A-1D having an integral cover and any of a variety of electrical connectors, according to various embodiments.
Figure 9A:
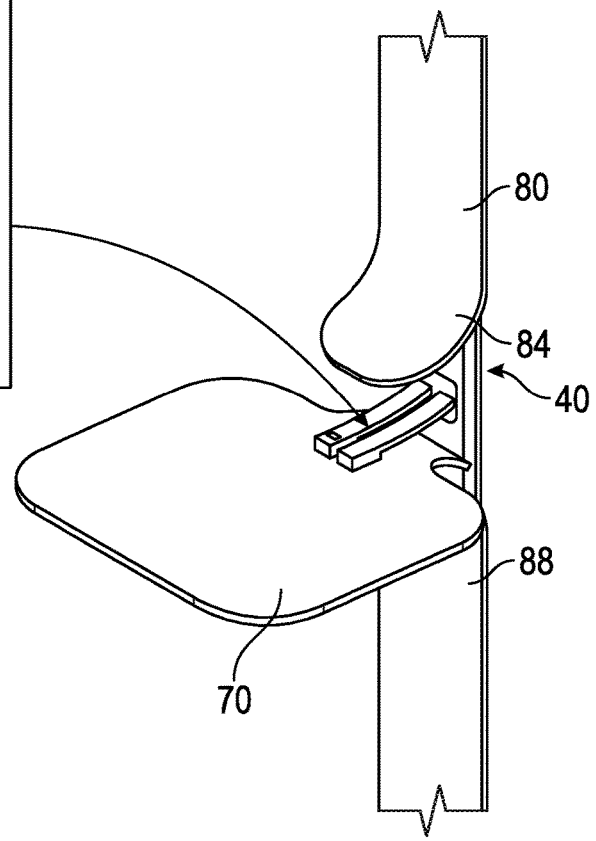

As shown in FIGS. 9A-9B, electrical connectors 60 may include any number or combination of various connector types. In one embodiment, electrical connectors 60 include cables that protrude from frame member 40 and have electrical elements coupled thereto. In one embodiment, the electrical elements include at least one of a male micro USB connector, a male iPhone 4® connector, a male iPhone 5® connector, a smartphone connector, a female USB connector, and a female standard electrical plug connector. According to still another alternative embodiment, electrical connectors 60 include both female and male electrical elements. In still other embodiments, electrical connectors 60 include components for wirelessly charging consumer electronic devices (e.g., a SplashPad®, etc.).

Figure 10:
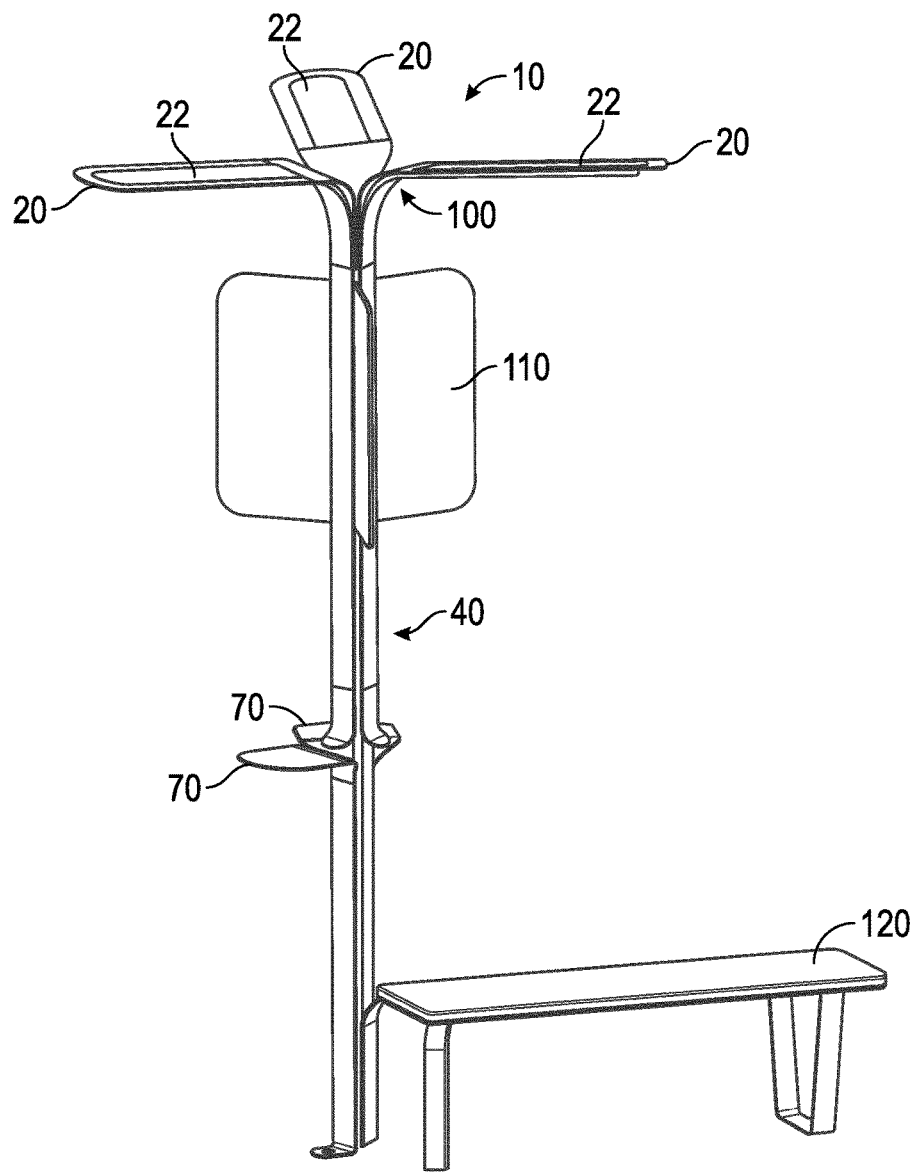
FIG. 10 is a perspective view of the freestanding solar-powered lighting device and charging system of FIGS. 1A-1D, integrated with a complementary structure, shown for example as a bench.

Referring next to FIG. 10, charging system 10 includes a complementary structure, shown as bench 120. In other embodiments, the complementary structure includes at least one of a chair, a pod, and a table. As shown in FIG. 10, bench 120 is integrated with frame member 40. In other embodiments, bench 120 is integrated with baseplate 30. Integrating bench 120 with at least one of frame member 40 and baseplate 30 may improve the stability of charging system 10.

Figure 11:
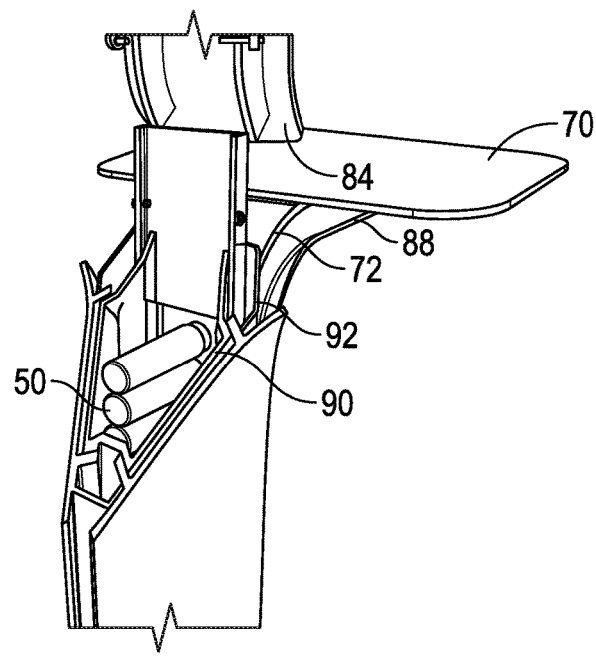
FIG. 11 is a cutaway view of the elongated frame members proximate the workstation of the freestanding solar-powered lighting device and charging system of FIGS. 1A-1D, illustrating a central column formed by the elongated members, in which the electrical components of the system may be stored and routed.

According to the exemplary embodiment shown in FIG. 11, energy storage device 50 is at least partially disposed within the vertical frame member. By way of example, energy storage device 50 may include a plurality of batteries positioned within the vertical frame member. The number of batteries may be adjusted based upon various power requirements. By way of example, the power requirements may include at least one of the power requirements of the consumer electronic devices to be charged, the power requirements of lighting devices associated with charging system 10, and the power requirements of signage associated with charging system 10. According to an exemplary embodiment, wiring associated with the photovoltaic cells, energy storage device 50, and the electrical connectors is at least partially disposed within the vertical frame member.

Figure 12:
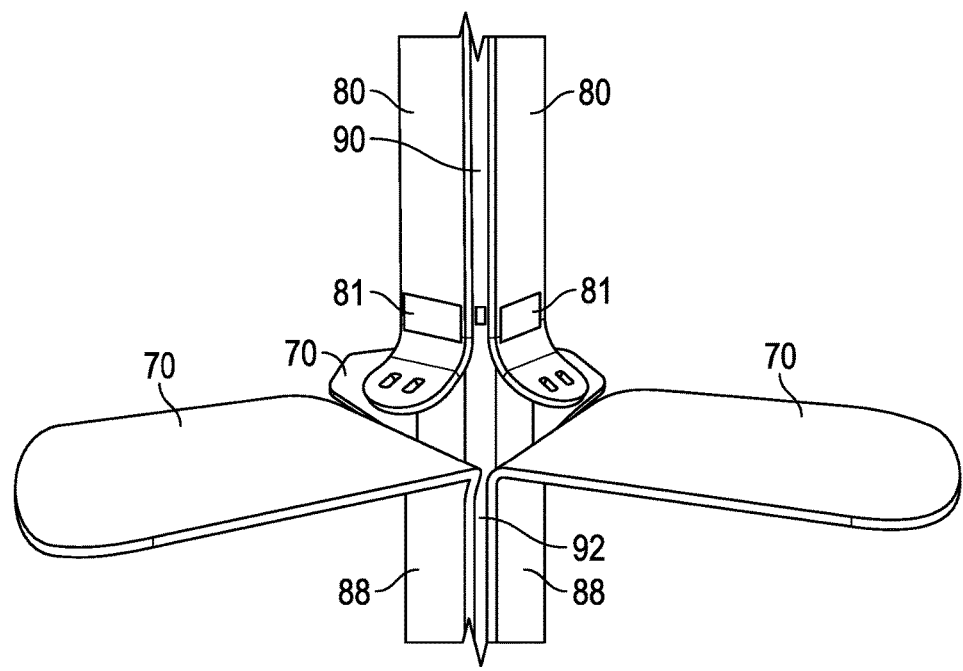
FIG. 12 provides a perspective view of a charging station and workstation portion of the freestanding solar-powered lighting device and charging system of FIGS. 1A-1D having adaptable color and branding schemas for use in coordination with a variety of intended locations or users.

Referring next to FIG. 12, various components of charging system 10 include surfaces intended to facilitate customized branding. As shown in FIG. 12, at least a portion of central core 90 and corner fill elements 92 may be exposed. Outer surfaces of these or other components may be painted, coated, anodized or otherwise marked (e.g., with logos) to correspond with the trademarks, trade dress, or branding of a particular entity. As shown in FIG. 12, individual frame members 80 also define surfaces 81 upon which corporate branding or use instructions may be disposed.

Figure 13:
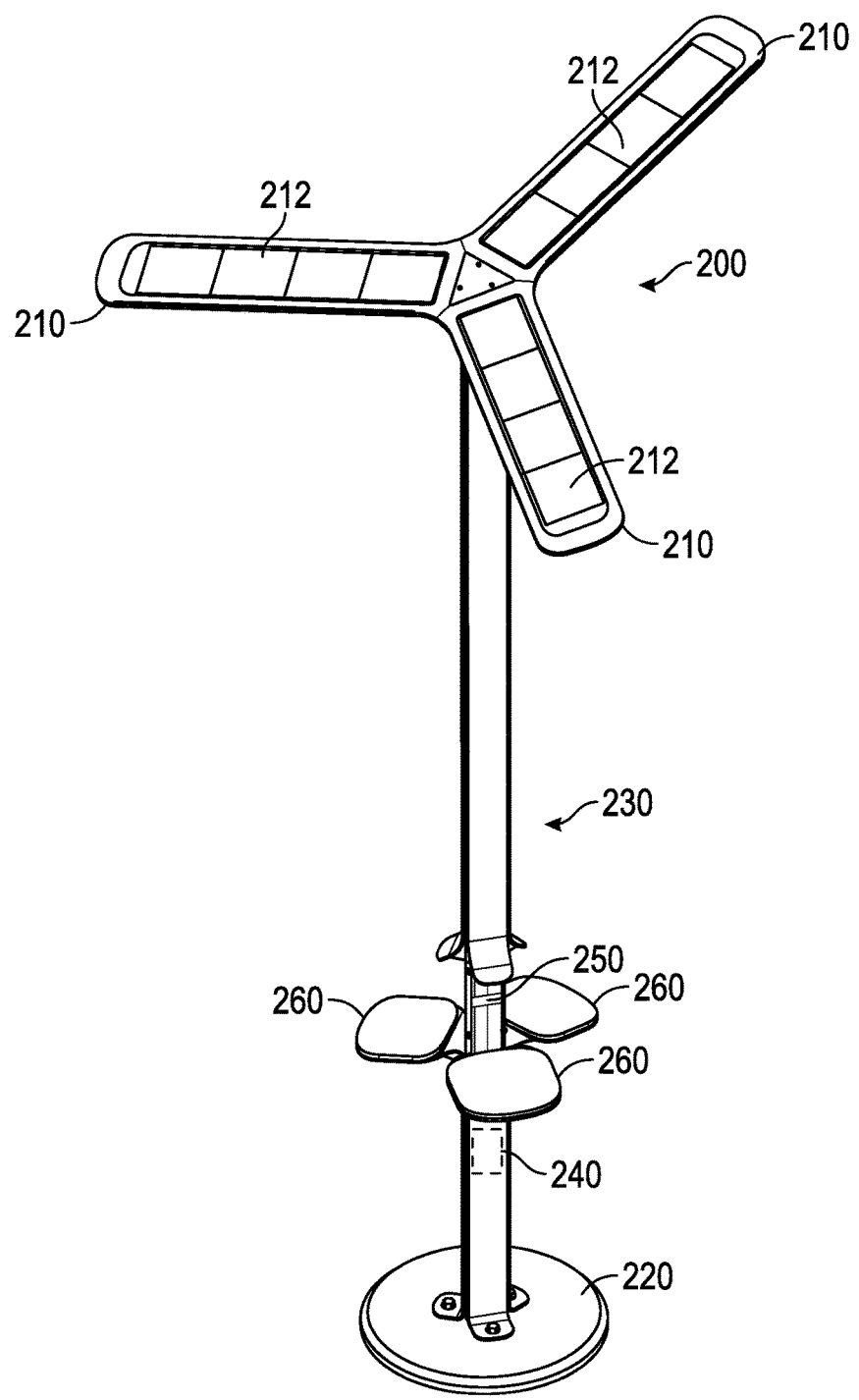
FIG. 13 is a front perspective view of a freestanding solar-powered lighting device and charging system, according to another embodiment.
Figure 14:
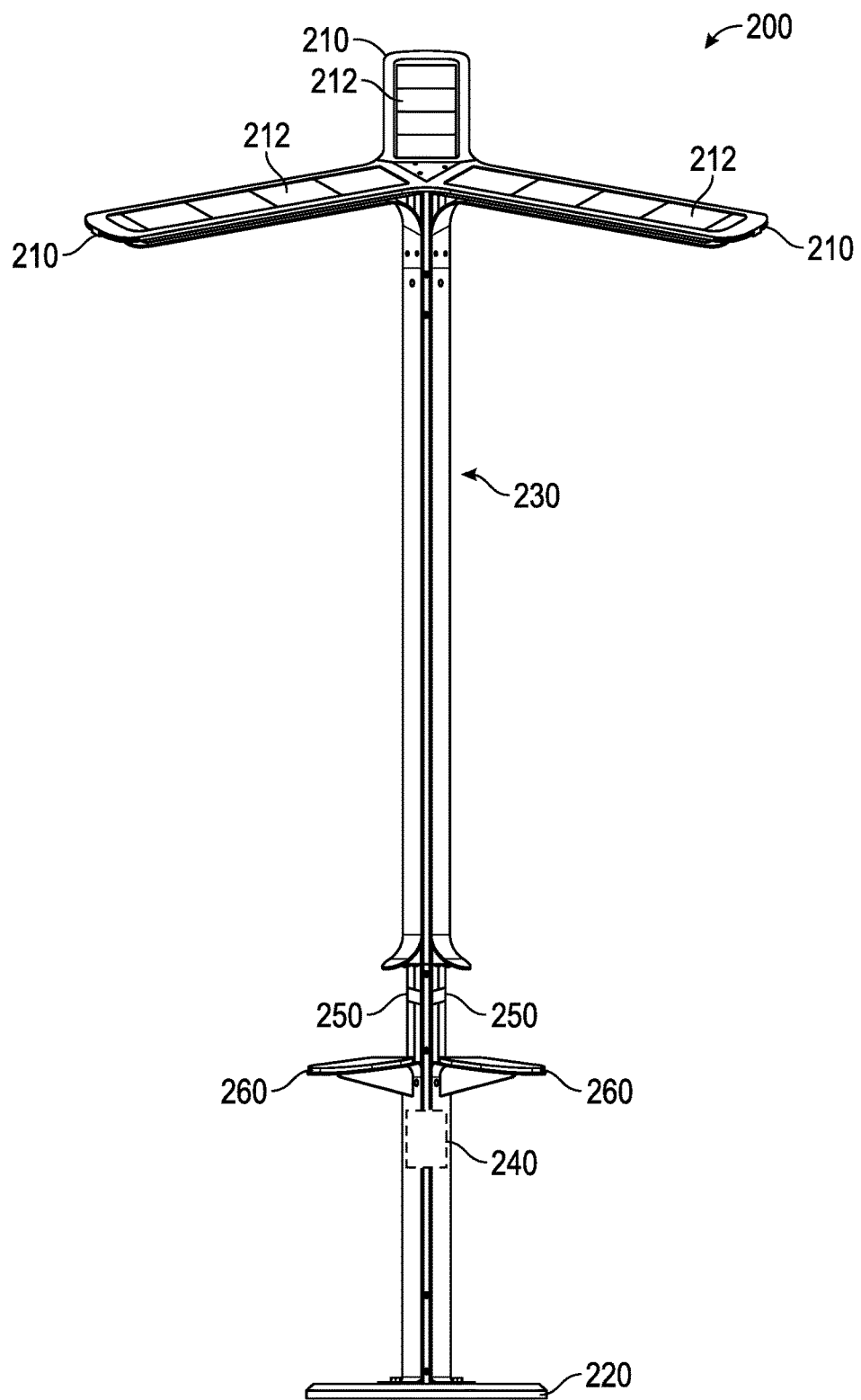
FIG. 14 is a front plan view of the embodiment of FIG. 13.
Figure 15:
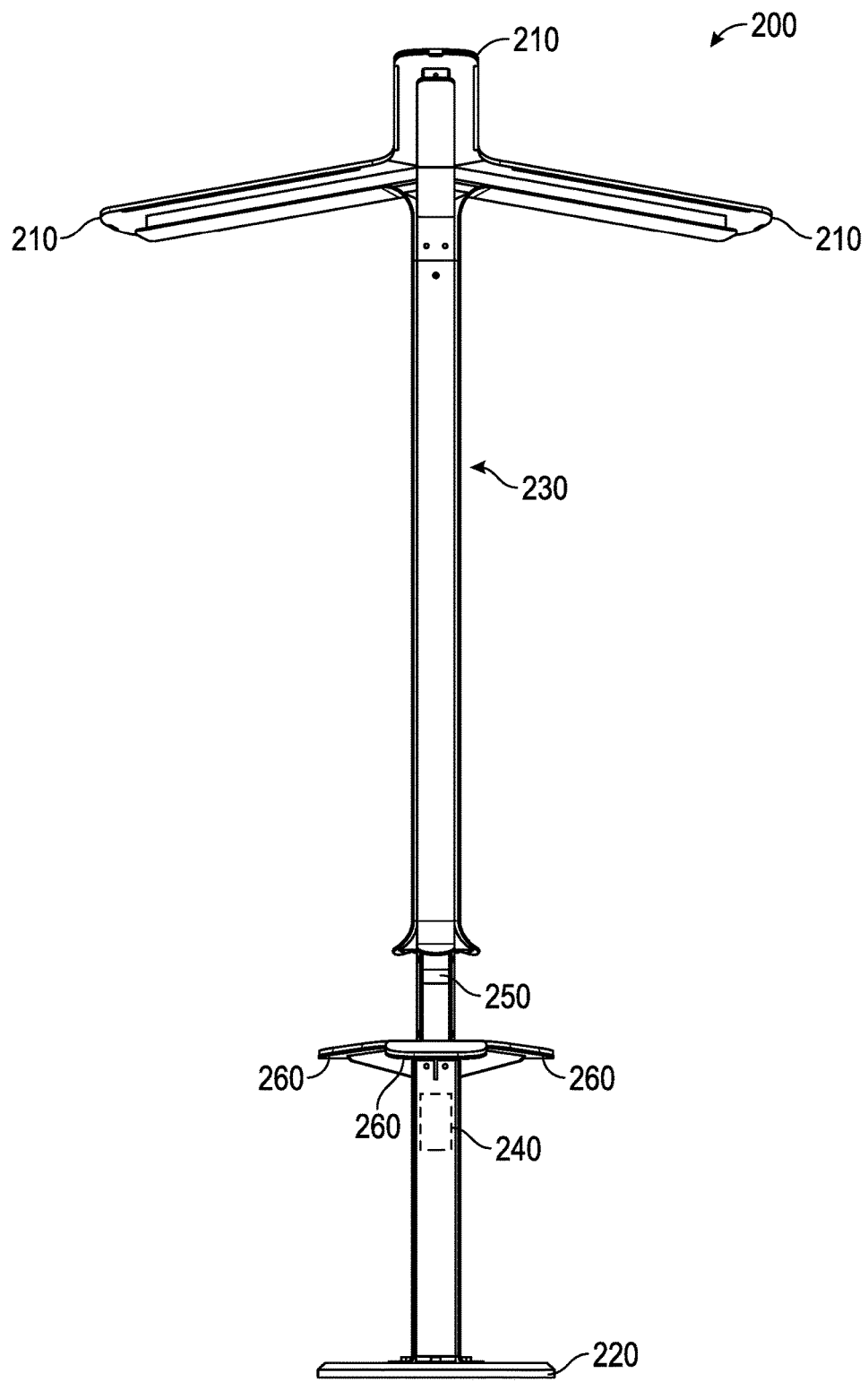
FIG. 15 is a rear plan view of the embodiment of FIG. 13.
Figure 16:
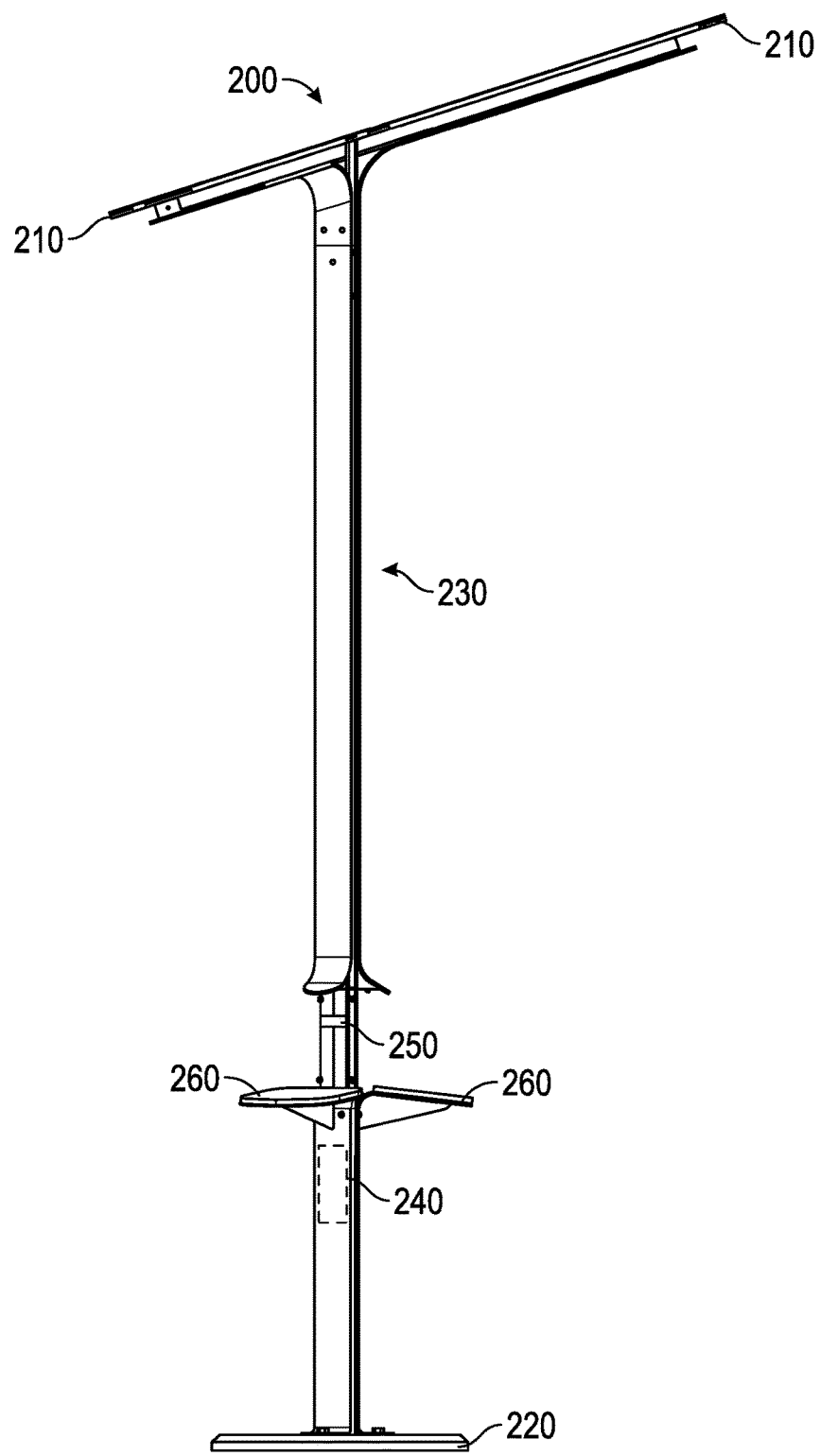
FIG. 16 is a right plan view of the embodiment of FIG. 13.
Figure 17:
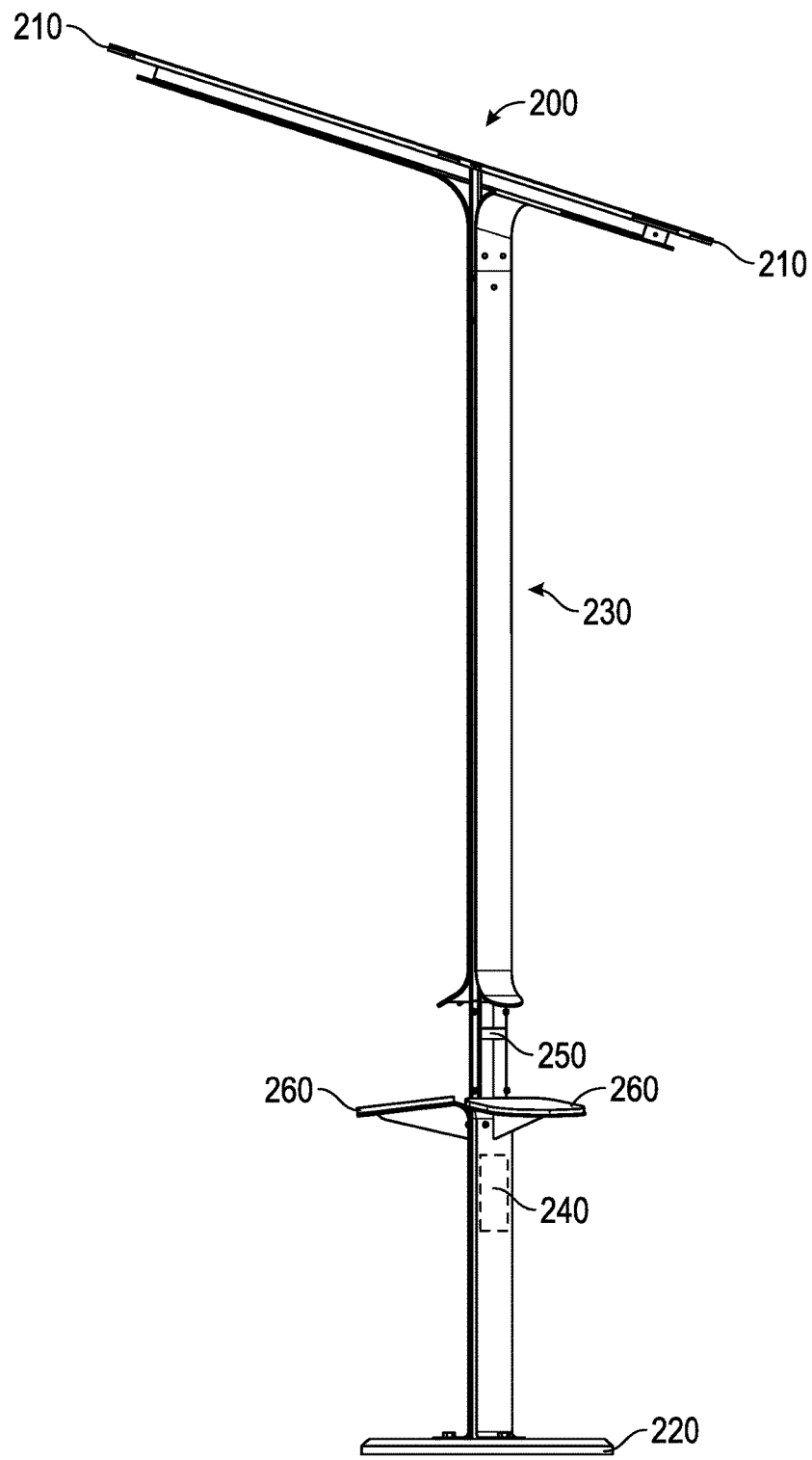
FIG. 17 is a left plan view of the embodiment of FIG. 13.
Figure 18:
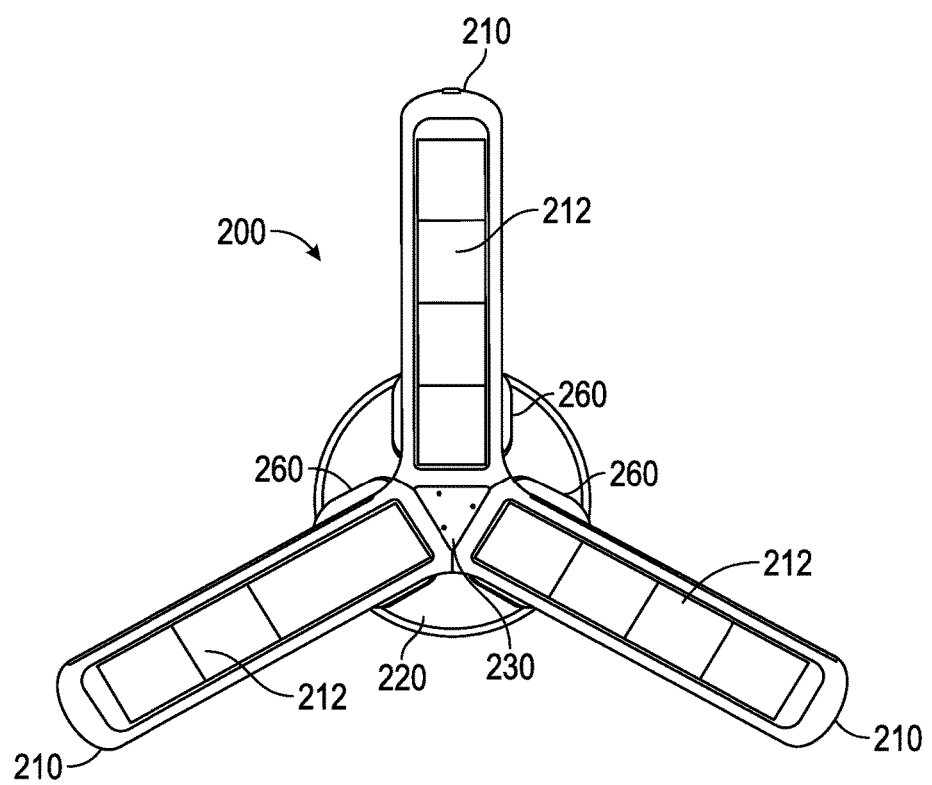
FIG. 18 is a top plan view of the embodiment of FIG. 13.
Figure 19:
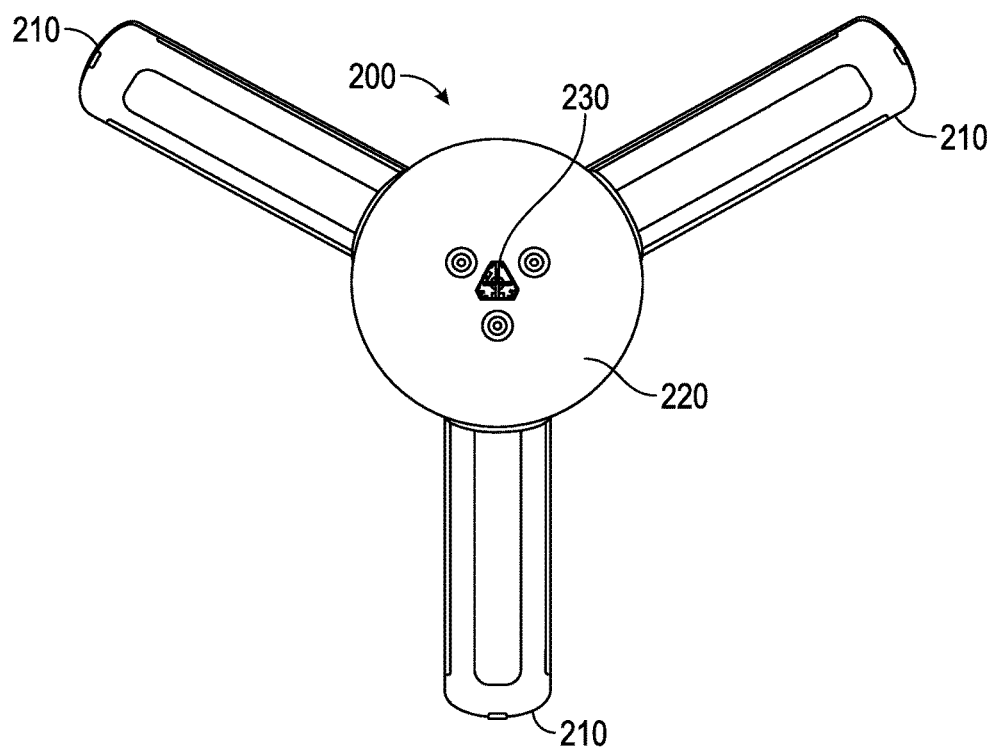
FIG. 19 is a bottom plan view of the embodiment of FIG. 13.

As shown in FIGS. 13-19, a solar-powered charging system, shown as charging system 200, includes a plurality of panels, shown as panels 210, coupled to a base, shown as baseplate 220, with a substantially vertical frame member, shown as frame member 230. A plurality of photovoltaic cells 212 define, or are coupled to, upper surfaces of panels 210. As shown in FIG. 13, charging system 200 includes an energy storage device 240 that is electrically coupled with photovoltaic cells 212 and a plurality of electrical connectors 250. A plurality of platforms, shown as platforms 260, are coupled to frame member 230.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the subject matter as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the orientation of various elements may differ according to other exemplary embodiments, and that such variations are intended to be encompassed by the present disclosure.

It is also important to note that the construction and arrangement of the freestanding solar-powered lighting device and charging systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present disclosure as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the disclosure.

What is claimed is:

1. A freestanding solar-powered charging system, comprising:
   a baseplate;
   a substantially vertical frame member having a first end and a second end, the first end coupled to and extending from the baseplate;
   one or more panels coupled to the second end of the vertical frame member, each of the panels having an upper surface with a photovoltaic cell;
   an energy storage device electrically coupled to the photovoltaic cell;
   one or more electrical connectors supported by the vertical frame member and electrically coupled to the energy storage device, the electrical connectors configured to engage any one or more of a plurality of consumer electronic devices for charging the consumer electronic devices, wherein the panels further comprise a lower surface having a lighting device configured to illuminate at least the electrical connectors;
   signage coupled to the vertical frame member, wherein the signage is at least one of self-illuminating and powered from the energy storage device, or illuminated by the lighting device, wherein the signage comprises an LED or LCD display panel; and hardware configured to transmit content to the signage from a remote location.

2. The freestanding solar-powered charging system of claim 1, wherein the baseplate is weighted to provide stability to the vertical frame member and the panels.

3. The freestanding solar-powered charging system of claim 2, wherein the baseplate further comprises an offset wheel, wherein the vertical frame member and the baseplate may be tilted to engage the offset wheel so that the freestanding solar-powered charging system may be rolled to any one of a plurality of locations.

4. The freestanding solar-powered charging system of claim 1, wherein the panels are disposed at an angle to maximize an incidence of solar irradiation on the photovoltaic cell.

5. The freestanding solar-powered charging system of claim 4, wherein the angle is adjustable.

6. The freestanding solar-powered charging system of claim 1, wherein the vertical frame member comprises a plurality of individual frame members, each one of the individual frame members having one of the panels coupled thereto.

7. The freestanding solar-powered charging system of claim 6, wherein the individual frame members further comprise outwardly extending covers disposed over the electrical connectors.

8. The freestanding solar-powered charging system of claim 1, wherein the vertical frame member further comprises at least one platform disposed proximate at least one of the electrical connectors and configured to support the consumer electronic devices.

9. The freestanding solar-powered charging system of claim 1, further comprising hardware configured to collect and transmit usage data and history.

10. The freestanding solar-powered charging system of claim 1, further comprising hardware configured to at least one of create a wi-fi hotspot and provide a cell phone signal repeater.

11. The freestanding solar-powered charging system of claim 1, wherein the electrical connectors comprises at least one a micro USB connector, a USB connector, a smartphone connector, and an electrical plug connector.

12. The freestanding solar-powered charging system of claim 1, further comprising at least one of a bench and a table integrated with at least one of the baseplate and the vertical frame member.

13. The freestanding solar-powered charging system of claim 1, wherein the energy storage device, and wiring associated with the photovoltaic cell, the energy storage device and the electrical connectors are at least partially disposed within the vertical frame member.

14. The freestanding solar-powered charging system of claim 1, wherein the photovoltaic cell is positioned at least 100 inches above a ground surface below the baseplate.

15. A freestanding solar-powered charging system, comprising:
a baseplate;
a substantially vertical frame member having a first end and a second end, the first end coupled to and extending from the baseplate;
one or more panels coupled to the second end of the vertical frame member, each of the panels having an upper surface with a photovoltaic cell;
an energy storage device electrically coupled to the photovoltaic cell; and one or more electrical connectors supported by the vertical frame member and electrically coupled to the energy storage device, the electrical connectors configured to engage any one or more of a plurality of consumer electronic devices for charging the consumer electronic devices, wherein the one or more electrical connectors are plated, and wherein the plating is configured to improve the weather resistance of the one or more electrical connectors.

16. A freestanding solar-powered charging system, comprising:
a column having three frame members arranged to form a substantially triangular cross section, each frame member having a first end and a second end, the first end configured for coupling to a support surface;
three panels coupled one each to the second end of each of the frame members and angularly spaced substantially equidistant from each other, each of the panels having an upper surface with at least one photovoltaic cell;
an energy storage device disposed within the column and electrically coupled to the photovoltaic cells;
one or more electrical connectors supported by each of the frame members and electrically coupled to the energy storage device, the electrical connectors configured to engage any one or more of a plurality of consumer electronic devices for charging the consumer electronic devices;
at least one platform coupled to each of the frame members proximate an associated electrical connector and configured to support the consumer electronic devices during charging;
signage coupled to the column and electrically coupled to the energy storage device, wherein the signage comprises an LED or LCD display panel; and
hardware configured to transmit content to the signage.

17. The freestanding solar-powered charging system of claim 16, wherein the upper surfaces of the panels are substantially coplanar and angled relative to the column.

18. The freestanding solar-powered charging system of claim 16, wherein the panels comprise a lower surface having at least one lighting device electrically communicating with the energy storage device and configured to illuminate at least its associated platform.

19. A freestanding solar-powered charging system, comprising:
a baseplate;
a substantially vertical frame member having a first end and a second end, the first end coupled to and extending from the baseplate;
one or more panels coupled to the second end of the vertical frame member, each of the panels having an upper surface with a photovoltaic cell;
an energy storage device electrically coupled to the photovoltaic cell;
one or more electrical connectors supported by the vertical frame member and electrically coupled to the energy storage device, the electrical connectors configured to engage any one or more of a plurality of consumer electronic devices for charging the consumer electronic devices; and
signage coupled to the vertical frame member, wherein the signage is at least one of self-illuminating and powered from the energy storage device.

* * * * *